United States Patent [19]

Warner, II

[11] Patent Number: 4,689,814
[45] Date of Patent: Aug. 25, 1987

[54] EXTERNAL DEVICE INTERFACE FOR AN ELECTRONIC TELEPHONE

[76] Inventor: Charles L. Warner, II, P.O. Box 56126, Atlanta, Ga. 30303

[21] Appl. No.: 868,775

[22] Filed: May 29, 1986

[51] Int. Cl.$^4$ .......................................... H04M 11/00
[52] U.S. Cl. ...................................... 379/93; 379/442
[58] Field of Search ................... 379/93, 97, 98, 442, 379/443, 100; 375/5

[56] References Cited

U.S. PATENT DOCUMENTS

| | | | |
|---|---|---|---|
| 4,063,045 | 12/1977 | Greischar | 379/442 X |
| 4,306,116 | 12/1981 | McClure et al. | 379/98 X |
| 4,368,358 | 1/1983 | Herschtal | 379/93 |
| 4,506,112 | 3/1985 | Bitsch | 379/442 X |
| 4,524,244 | 6/1985 | Faggin et al. | 379/93 |
| 4,546,212 | 10/1985 | Crowder, Sr. | 379/93 X |
| 4,558,369 | 12/1985 | Shinohara et al. | 379/100 X |
| 4,578,534 | 3/1986 | Shelley | 179/2 C X |
| 4,626,631 | 12/1986 | Hanscom | 379/442 X |
| 4,639,553 | 1/1987 | Kiguchi | 379/100 X |

FOREIGN PATENT DOCUMENTS 3410145 10/1985 Fed. Rep. of Germany ...... 379/442
0223370 11/1985 Japan .................................. 379/442

*Primary Examiner*—Gene Z. Rubinson
*Assistant Examiner*—Matthew E. Connors
*Attorney, Agent, or Firm*—Jones & Askew

[57] ABSTRACT

A telephone switch (10) having a data port (DNS) and a vioice port (VPS) is connected to an electronic telephone (12) having a data port (DNT) and a voice port (VPT) through the preferred embodiment (19). A plurality of external devices (13a, 13b, ... 13n) are also connected to the preferred embodiment (19). When no external device (13a, 13b, ... 13n) is active, a relay (33) directly connects the voice port (VPS) of the telephone switch (10) to the voice port (VPT) of the electronic telephone (12). When an external device (13a, 13b, ... 13n) is active, the relay (33) directly connects the voice port (VPS) of the telephone switch (10) to the voice port (V) of the external device (13a, 13b, ... 13n) and also connects these voice ports (VPS, V) to the voice port (VPT) of the electronic telephone (12) through a resistor network (20, 21, 24, 26, 30) which passes operating power to the electronic telephone (12) but reduces or eliminates audio signals to/from the electronic telephone (12).

27 Claims, 2 Drawing Figures

EXTERNAL DEVICE INTERFACE FOR AN ELECTRONIC TELEPHONE

TECHNICAL FIELD

The present invention is in the field of telephone systems and particularly relates to the interfacing of an electronic telephone with an external device such as a modem or a speakerphone.

BACKGROUND OF THE ART

Many PBX telephone systems have or allow the use of advanced, multibutton, multifeature electronic telephones. In some cases, the PBX system is designed for use only with such electronic telephones. In an effort by the manufacturer to provide the most benefit to the user, many of these electronic telephones are equipped with a handsfree (speakerphone) feature. However, in order to keep the price of the electronic telephone competitive, the design of the handsfree feature is often subject to feature benefit v. feature cost tradeoffs, sometimes resulting in low sensitivity, excessive talk-to-listen switching delay time, false activation by noise, etc. Therefore, a user will often purchase an external speakerphone specifically designed to avoid these disadvantages.

Also, many users have computers and desire to have these computers exchange data with other computers over standard telephone lines. Typtically, the computer is interfaced to the telephone line by a modem (modulator-demodulator).

FIG. 1 shows a typical prior art method of connecting an external device 13 (external speakerphone or modem) to a telephone system comprising a telephone switch 10 and one or more electronic telephones 12.

Telephone switch 10 is connected to one or more telephone company central office trunk lines 8. ports VPS and DNS of switch 10 are connected by a four-conductor cable 11 to one port of a "T"-connector 9. A second port of "T"-connector 9 is connected to the VPT and DNT ports of electronic telephone 12 by four-conductor cable 14. The third port of "T"-connector 9 is connected to the V and C ports of external device 13 by four-conductor cable 15. External device 13 is typically a speakerphone or a modem.

External device 13, when activated, will typically place a short across the terminal of its control (C) port. If a conventional "T"-connector is used for connector 9 then, when external device 13 is activated, conductors 11a and 11d, and 15a and 15d, of cables 11 and 15 will be shorted. Telephone switch 10, in response to this short, will typically disable its VPS and DNS ports until the short is removed. Therefore, a modified "T"-connector is generally used for connector 9. The modified "T"-connector 9 has no connecting pins for conductors 15a and 15d of cable 15, so when the external device 13 shorts conductors 15a and 15d, conductors 11a and 11d will not be shorted and telephone switch 10 will allow its VPS and DNS ports to remain enabled.

However, even if external device 13 is successfully connected to telephone switch 10 and electronic telephone 12 other problems frequently occur.

For example, if external device 13 is a speakerphone and external device 13 is activated then acoustical feedback may occur. It will be appreciated by anyone who has experienced acoustical feedback that the piercing sound generated is extremely unpleasant and quite effective in causing the user to press every button he can find on electronic telephone 12 in a desperate attempt to stop the feedback. Frequently, the connection with the called party is broken during this activity. Even more frequently, the user abandons use of the speakerphone and uses the less convenient regular handset to avoid this problem.

Of course, the acoustical feedback problem is, in reality, resolved rather easily by first pressing the microphone "MUTE" key on electronic telephone 12, if it is so equipped, then placing the handset, preferably speaker down, onto a sound absorbent surface, such as a handkerchief or a coat. However, counting the last step of turning on external device 13, three steps are required to change the communication path from electronic telephone 12 to external device 13. Likewise, three steps are required to change back to electronic telephone 12. This makes it inconvenient to establish calls using external device 13 or to switch the communication path back and forth between electronic telephone 12 and external device 13. Therefore, there is a need for a device which will allow the communications path to be switched from electronic telephone 12 to external device 13 by simply pressing the "on" button on external device 13.

If external device 13 is a modem, a different set of problems occurs. First, the user must typically take the handset off hook and/or turn down the volume on electronic telephone 12 to avoid hearing the "noise" and tones of the modem data transfer signals.

Another problem is that room noise and conversations will be picked up by electronic telephone 12 and placed onto cables 11 and 15 via cable 14. The room noise and conversations will appear as noise on top of the modem data transfer signals, thereby introducing phase and amplitude distortion into the modem data transfer signals and degrading or prohibiting the transfer of data by the modems. Of course, this can be remedied by enabling the microphone mute feature of electronic telephone 12.

Therefore, in order to use the modem (external device 13) the user must first turn down the volume on electronic telephone 12, then mute the microphone on electronic telephone 12, and finally, activate the modem (external device 13). Likewise, three steps are also required to change from use of a modem back to use of electronic telephone 12. Therefore, there is a need for a device which will allow the communications path to be switched from electronic telephone 12 to external device 13 by simply activating external device 13.

It is, of course, a relatively simple matter to switch audio conductors 11b and 11c from electronic telephone 12 to external device 13 if the characteristics of the switch and electronic telephone sets are compatible with standard 2 wire telephone sets. In this type of system, d.c. operating voltage is supplied to each phone set over a tip/ring wire pair which also carries audio information. However, in some PBX telephone systems, the audio conductors 11b and 11c form one leg of the power supply for electronic telephone 12 while the other leg of the power supply is provided on a data pair. In other words, in such a PBX there is no d.c. voltage between the conductors of the audio pair. If audio conductors 11b and 11c are simply switched from electronic telephone 12 to external device 13, electronic telephone 12 will be deprived of operating power and stop communicating with telephone switch 10. In such a case, telephone switch 10 will determine that electronic telephone 12 is malfunctioning, disable its VPS and DNS ports, and drop any connection to the central office trunk line 8, thereby preventing external device 13 from being used.

The present invention was designed for use with this type of PBX system. One example of such a system currently available as of the filing date of this application is the EZ-1/96, manufactured by Isoetec.

Electronic telephone 12 does not perform dual-tone multiple-frequency (DTMF) dialing. Instead, electronic telephone 12 sends data signals over conductors 11a and 11d to telephone switch 10. Telephone switch 10, in response to the data signals, generates the DTMF tones and, for the user's convenience, places these tones onto conductors 11b and 11c. If the user has been connected to a central office trunk line 8 then telephone switch 10 also places the DTMF tones onto trunk line 8.

There is therefore a need for a device which, in response to external device 13 being activated, will disable the audio to and from electronic telephone 12 without interrupting power to electronic telephone 12 or causing electronic switch 10 to determine that electronic telephone 12 is malfunctioning.

Furthermore, since external device 13 is generally limited in the functions it can perform (typically, only DTMF dialing), there is a need for a device, as above, which also allows electronic telephone 12 to perform most of its normal functions (on hook/off hook, dialing, do not disturb, speed dialing, last number redial, callback, transfer, conferencing, etc,), even when external device 13 is activated.

In telephone conferences between the inventor and technical personnel at Isoetec, the technical personnel stated that such a device was not possible because of the nature of the telephone switch 10 and the electronic telephone 12. Furthermore, the technical personnel indicated that, because of the manner of providing power, data signals, and audio signals, the only proper method of connecting an external device 13 to telephone switch 10 was by using an Isoetec interface card which caused external device 13 to be treated as a separate station and use another DNS/VPS port pair in telephone switch 10. The price of the interface card and the desire to avoid using another DNS/VPS port pair were some of the factors leading to the present invention.

SUMMARY OF THE INVENTION

Broadly stated, the present invention provides an interface device for connecting one or more external devices to an electronic telephone system.

Also broadly stated, the present invention provides an interface device which allows one or more external devices to seize the audio signal lines from an electronic telephone without disrupting the operation of the electronic telephone or the telephone switch.

Also broadly stated, the present invention provides an interface device which allows one or more external devices to seize the audio signal line from a telephone switch without disrupting the operation of the electronic telephone or the telephone switch in systems for which disconnection of the audio lines from the electronic telephone will cause the electronic telephone to stop operating.

In its preferred form, the present invention normally passes a normal operating voltage to the electronic telephone but passes a reduced, but sufficient, operating voltage to the electronic telephone when an external device becomes active.

In its preferred form, the present invention normally provides a full audio signal voltage to the electronic telephone but passes a reduced or no audio signal voltage to the electronic telephone when an external device becomes active.

In its preferred form, the present invention uses a resistor network and relay to selectably pass a reduced operating voltage to an electronic telephone and short out the audio signal to/from the electronic telephone, or to pass the full operating voltage to and the full audio signal to/from the electronic telephone.

Therefore, it is an object of the present invention to allow the audio signal path to be switched from an electronic telephone to an external device by simply activating the external device.

It is another object of the present invention to allow the audio signal path to be switched from an electronic telephone to an external device while maintaining use of the features of the electronic telephone.

It is another object of the present invention to allow the audio signal path to be switched from an electronic telephone to an external device without interrupting the operating power to the electronic telephone.

It is another object of the present invention to allow the audio signal path to be switched from an electronic telephone to an external device without alerting the telephone switch that the audio signal path to the electronic telephone has been altered.

It is a further object of the present invention to allow an external device to exchange audio signals with an electronic telephone while blocking audio signals to/from the telephone switch.

That the present invention meets these and other object of the present invention will be apparent from the detailed description below.

DETAILED DESCRIPTION

Figure 1:
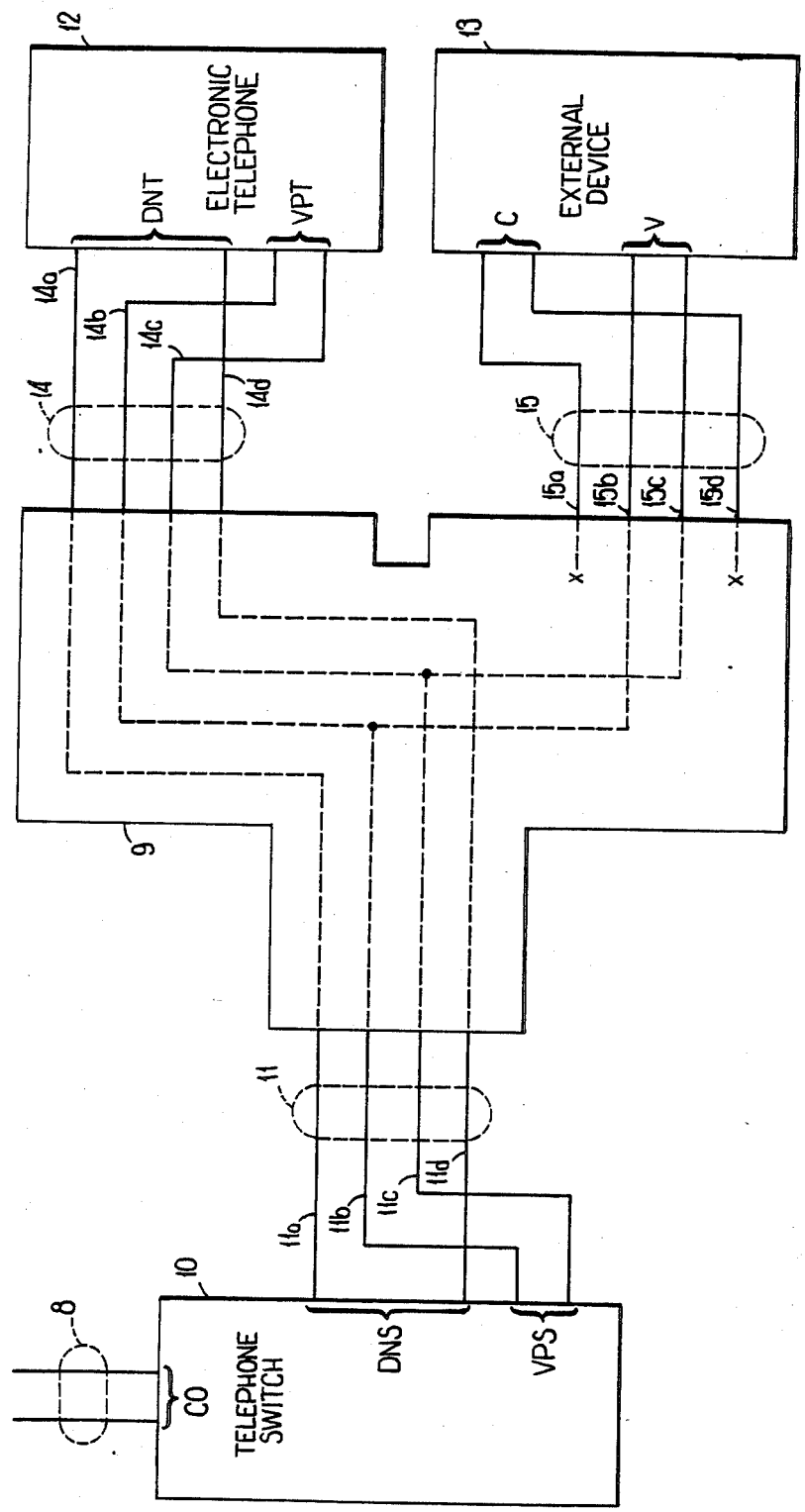
FIG. 1 is a block diagram of a typical prior art connection of a telephone switch, an electronic telephone, and external device.
Figure 2:
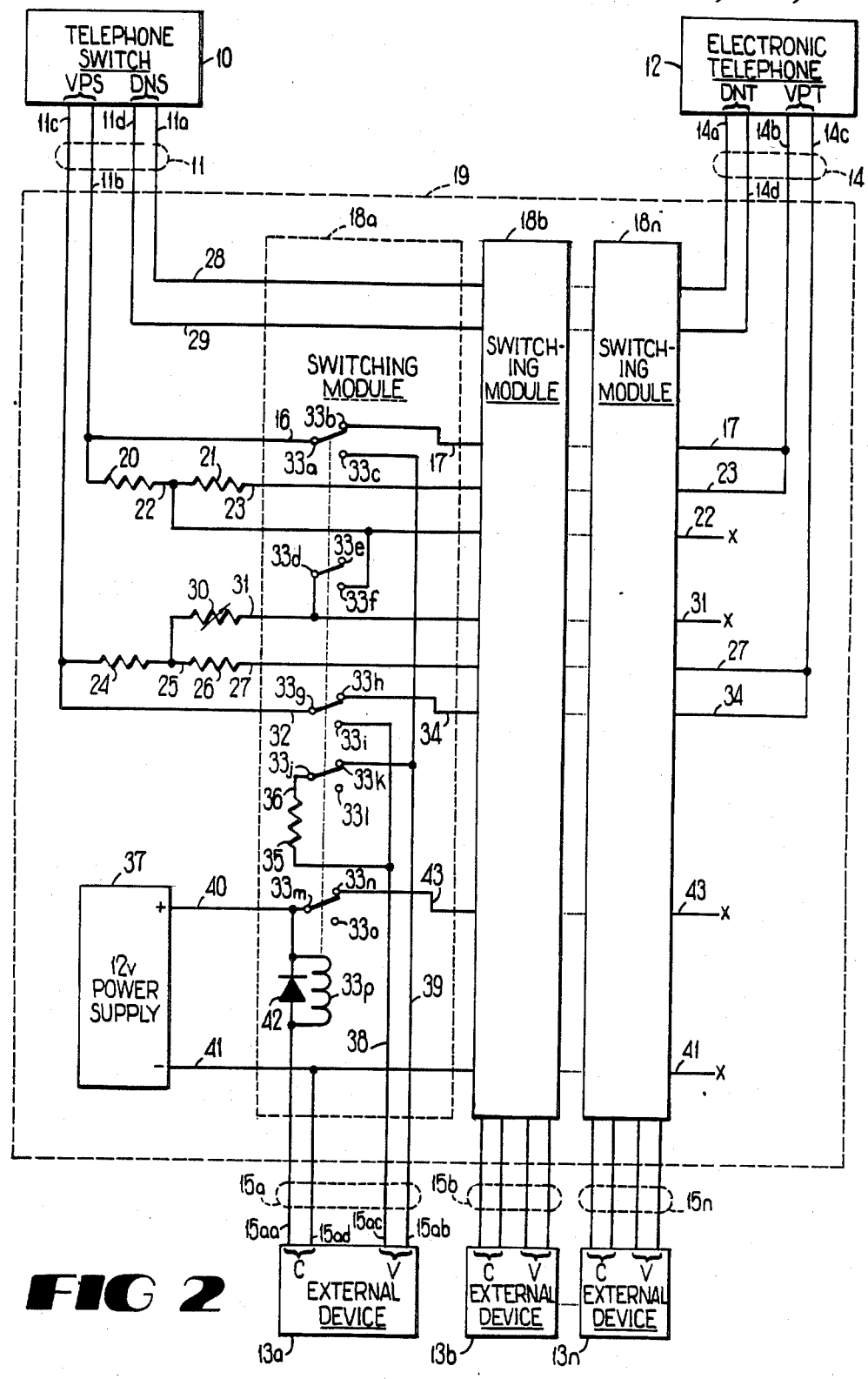
FIG. 2 is a schematic diagram of the preferred embodiment of the present invention in its preferred environment.

Turning now to FIG. 2, the preferred embodiment of the present invention will be described. Elements of the preferred embodiment which correspond to elements of the prior art system of FIG. 1 are referenced with the same numeral in both figures.

FIG. 2 is a schematic diagram of the preferred embodiment of the present invention in its preferred environment. Telephone switch 10 is an electronic telephone system switch such as the Isoetec EZ-1/96. Telephone switch 10 has a voice port VPS and a data port DNS for each electronic telephone 12. Telephone switch 10 sends and receives audio signals and provides a positive output voltage via voice port VPS over conductors 11b and 11c. Telephone switch 10 sends and receives data signals and provides a negative output voltage via data port DNS over conductors 11a and 11d. Telephone switch 10 typically maintains conductors 11b and 11c at a potential of approximately +30 volts DC with respect to conductors 11a and 11d. The inventor does not know how much current telephone switch 10 can provide but believes that telephone switch 10 can provide between 60 and 100 milliamps. Conductors 11a, 11b, 11c and 11d are typically part of a four or six conductor telephone cable 11.

The audio signals appear across conductors 11b and 11c. The data signals appear across conductors 11a and 11d. If the audio signals and data signals are ignored, both conductors 11b and 11c have the same potential with respect to both conductors 11a and 11d. The same relationship is true between conductors 14a, 14b, 14c and 14d.

Electronic telephone 12 is an electronic telephone such as the Isoetec Key phone II. Electronic telephone 12 sends and receives audio signals and receives its positive supply voltage via a voice port VPT over conductors 14b and 14c. Electronic telephone 12 sends and receives data signals and receives its negative supply voltage via a data port DNT over conductors 14a and 14d. Electronic telephone 12 requires an operating current of approximately 50 milliamps. The operating current varies according to how many of the LED indicators in electronic telephone 12 are turned on. Conductors 14a, 14b, 14c, and 14d are typically part of a four or six conductor telephone cable 14.

Electronic telephone 12 has two internal voltage regulators: 15 volts, for analog (audio signal) components; and 5 volts, for logic components. Although the audio signal level begins to drop when the operating voltage (across ports DNT and VPT) drops below 16 volts, electronic telephone 12 will still operate with an operating voltage of approximately 6 volts.

The preferred embodiment 19 comprises four resistors 20, 21, 24 and 26, one variable resistor 30, a 12 volt DC power supply 37, and one or more switching modules 18a, 18b, . . . 18n. In the preferred embodiment 19 the data signals and negative operating voltage are not affected. Therefore, one terminal of the port DNS is connected to one terminal of port DNT via the series of conductors 11a, 28 and 14a. Likewise, the other terminal of port DNS is connected to the other terminal of port DNT via the series of conductors 11d, 29, and 14d. Conductors 28 and 29 pass undisturbed through modules 18a, 18b, . . . 18n. This assures that the electronic telephone 12 receives the required negative operating voltage and that telehone switch 10 and electronic telephone 12 are able to continue exchanging data signals.

One terminal of port VPS is connected by conductor 11b to conductor 16 and one end of resistor 20. The other end of resistor 20 is connected by conductor 22 to one end of resistor 21. The other end of resistor 21 is connected to conductor 23. The other terminal of port VPS is connected by conductor 11c to conductor 32 and one end of resistor 24. The other end of resistor 24 is connected by conductor 25 to one end of resistor 26 and one end of variable resistor 30. The other end of resistor 26 is connected to conductor 27. The other end of variable resistor 30 is connected to conductor 31. Conductors 16, 22, 23, 27, 31 and 32 are connected to module 18a, The positive output and the negative output of a 12 volt DC power supply 37 are connected by conductors 40 and 41, respectively, to module 18a.

Now consider module 18a. Module 18a comprises a five-pole, double-throw relay 33, a diode 42, and a resistor 35. The center contacts of relay 33 are 33a, 33d, 33g, 33j, and 33m. The normally closed contacts of relay 33 are 33b, 33e, 33h, 33k, and 33n. The normally open contacts of relay 33 are 33c, 33f, 33i, 33l, and 33o. The coil of relay 33 is designated 33p. Contacts 33a, 33b, and 33c form a first set of contacts, contacts 33d, 33e and 33f form a second set of contacts, contacts 33g, 33h, and 33i form a third set of contacts, contacts 33j, 33k, and 33l form a fourth set of contacts, and contacts 33m, 33n, and 33o form a fifth set of contacts.

Conductor 16 is connected to contact 33a. Contact 33b is connected to conductor 17. Conductor 17 of module 18a becomes the conductor 16 (not shown) of module 18b, the conductor 17 (not shown) of module 18b becomes the conductor 16 (not shown) of the next module 18c (not shown), and so on. Finally, the conductor 17 of the last module 18n is connected to conductor 23 and to conductor 14b. Conductor 14b is connected to one terminal of port VPT of electronic telephone 12. Conductor 23 passes, unaffected, through each module 18a, 18b—18n.

Conductor 22 is connected to contact 33f of module 18a, contact 33f (not shown) of module 18b, and so on. When conductor 22 exits the last module 18n it is not connected to anything.

Conductor 31 is connected to contact 33d of module 18a, contact 33d (not shown) of module 18b, and so on. When conductor 31 exits the last module 18n it is not connected to anything.

Conductor 32 is connected to contact 33g. Contact 33h is connected to conductor 34. Conductor 34 of module 18a becomes the conductor 32 (not shown) of module 18b, the conductor 34 of module 18b becomes the conductor 32 (not shown) of the next module 18c (not shown), and so on. Finally, the conductor 34 of the last module 18n is connected to conductor 27 and to conductor 14c. Conductor 14c is connected to the other terminal of port VPT of electronic telephone 12.

Conductor 27 passes, unaffected, through each module 18a, 18b, . . . 18n.

Contact 33c is connected to contact 33k and to one terminal of port V of external device 13a by conductors 39 and 15ab. Contact 33i is connected to one end of resistor 35 and to the other terminal of port V of external device 13a by conductors 38 and 15ac. The other end of resistor 35 is connected by conductor 36 to contact 33j.

Conductor 40 is connected to contact 33m, the cathode of diode 42, and one end of coil 33p. The other end of coil 33p and the anode of diode 42 are connected by conductor 15aa to one terminal of control port C of external device 13a. Conductor 41 is connected to the other terminal of control port C by conductor 15ad. Conductor 41 also passes on to module 18b, 18c (not shown),—18n. When conductor 41 exits from the last module 18n it is not connected to anything. Contact 33n is connected to conductor 43. Conductor 43 of module 18a becomes the conductor 40 (not shown) of module 18b, the conductor 43 (not shown) because the conductor 40 (not shown) of the next module, and so on. When conductor 43 exits from the last module 18n it is not connected to anything.

It will be appreciated that diode 42 is a damping diode for coil 33p.

External device 13a has a voice port V, via which it sends and/or receives audio signals. External device 13a also has a control port C. When external device 13a is active, control port C shorts conductors 15aa and 15ad together. When external device 13a is not active, control port C presents an open circuit to conductors 15aa and 15ad. Conductors 15aa, 15ab, 15ac and 15ad are typically part of a four or six conductor telephone cable 15a.

Modules 18b, . . . 18n are preferably identical to module 18a. External devices 13a, 13b, . . . 13n are typically different types of devices. For example, external device 13a may be a modem, external device 13b may be a speakerphone, external device 13n may be a tape recorder/playback unit, and so on.

Now consider the operation of the preferred embodiment 19. First, assume that all external devices 13a, 13b, . . . 13n are not active. Relay 33 will be in a de-energized state. Conductor 11b will be connected to conductor 14b via the series combination of conductor 16, contacts 33a and 33b, and conductor 17 of module 18a, and likewise through modules 18b, . . . 18n. Conductor 11c will be connected to conductor 14c via the series combination of conductor 32, contacts 33g and 33h, and conductor 34 of module, and likewise through modules 18b, . . . 18n. Therefore, the voice port VPT of electronic telephone 12 may be considered to be directly connected to the voice port VPS of telephone switch 10. Electronic telephone 12 therefore functions in a completely normal manner.

The voice port V of external device 13a is connected to resistor 35 via conductors 15ab, 15ac, 36, 38, 39, and contacts 33j and 33k. In the preferred embodiment 19, resistor 35 is approximately 600 ohms. Resistor 35 therefore acts as a load resistor for external device 13a when external device 13a is not active. Typtically, if external device 13a is not active, load resistor 35 is not required. However, some devices, even if in the "not active" state, will oscillate or malfunction if a load is not present. Also, as is explained below, it is possible for a downstream device 13b, . . . 13n to be active and denied access to the audio signal conductors 11b and 11c, Many external devices, especially speakerphones, will oscillate or malfunction if placed in the active state and denied access to a load, such as a telephone line. Therefore, the resistor 35 (not shown) of downstream modules 18b . . . 18n provides a load for its associated external device 13b . . . 13n in situations where the device 13b . . . 13n is active but denied access.

Now assume that variable resistor 30 is set for 0 ohms and that external device 13a becomes active. Relay 33 will be energized, Conductors 14b and 14c will no longer be directly connected to conductors 11b and 11c. Instead, conductor 14b will be connected to conductor 11b via the series combination of conductors 22 and 23 and resistors 20 and 21. Likewise, conductor 14c will be connected to conductor 11c via the series combination of conductors 25 and 27 and resistors 24 and 26. Also, since variable resistor 30 has a value of 0 ohms, conductors 22 and 25 will be shorted together by relay contacts 33d and 33f. Therefore, both terminals of port VPT will be connected to conductor 22 via resistors 21 and 26. Likewise, both terminals of port VPS will be connected to conductor 22 via resistors 20 and 24.

Since both terminals of port VPT are now connected through resistors 21 and 26 to the same point (conductor 22), there is no differential voltage across conductors 14b and 14c. Therefore, telephone set 12 can receive no audio signals. Likewise, since both terminals of port VPT are now connected through resistors 20 and 24 to the same point (conductor 22) then, when telephone set 12 places a differential voltage across conductors 14b and 14c, there will still be no differential voltage across conductors 11b and 11c. Therefore, telephone switch 10 receives no audio signals from electronic telephone 12. Therefore, with respect to audio signals, telephone switch 10 and electronic telephone 12 may be considered to be disconnected from each other.

However, there may be a situation wherein it is desirable that telephone switch 10 and electronic telephone 12 still maintain some degree of exchange of audio signals, These situations are accommodated by variable resistor 30. Increasing the value of resistor 30 decreases the shorting between conductors 22 and 25, thereby allowing a desired amount of the audio signals to be exchanged between telephone switch 10 and electronic telephone 12.

Note that the series/parallel combination of resistors 20, 21, 24 and 26 still allows the positive supply output of port VPS to reach port VPS. There will, of course, be some voltage drop across resistors 20, 21, 24 and 26. However, as long as electronic telephone 12 receives at least 6 volts (between ports VPT and DNT) it will operate properly and still communicate data signals, via port DNT, to telephone switch 10. Electronic telephone 12 therefore appears, to telephone switch 10, to be properly connected, so telephone switch 10 will not disable its VPS and DNS ports to electronic telephone 12.

Also note that port VPT is always connected to port VPS through resistors 20, 21, 24 and 26. When relay 33 is not energized resistors 20, 21, 24 and 26 are merely bypassed, thereby providing the full voltage of port VPS to port VPT. Therefore, at no time during the action of relay 33 is port VPT totally disconnected from port VPS. Therefore, electronic telephone 12 always receives operating voltage and functions properly. It will be appreciated that a typical electronic telephone 12 will malfunction if the operating voltage is totally removed, even briefly.

Therefore, even though electronic telephone 12 is no longer capable of sending or receiving audio signals, its features are still available to the user. That is, the user still uses electronic telephone 12 to request an internal line (intercom) or an outside (trunk) line, to dial numbers, including speed dialing, last number redial, to key in an account code, etc. The dialing feature is still available because electronic telephone 12 does not generate DTMF tones but sends data signals to telephone switch 10, which generates the DTMF tones. Also, the handsfree (speakerphone) and mute features still operate, but these features are internal to electronic telephone 12, therefore, the user will not notice any effect from these features as long as the audio signals to/from electronic telephone 12 are disabled by the preferred embodiment 19.

Note also that, since relay 33 is energized, one terminal of port V of external device 13a is connected by conductors 11c, 15ac, 32, and 38 and contacts 33g and 33i, to one terminal of port VPS of telephone switch 10. Likewise, the other terminal of port V is connected by conductors 11b, 15ab, 16 and 39, and contacts 33a and 33c to the other terminal of port VPS. port V of external device 13a is therefore directly connected to port VPS of telephone switch 10. Therefore, external device 13a can send and/or receive audio signals from telephone switch 10.

Furthermore, since relay 33 is energized, conductor 43 is no longer connected to the 12 volt power supply 37, Therefore, downstream devices 13b, . . . 13n, even if active, cannot energize the relay 33 in the corresponding module 18b . . . 18n. It will now be appreciated that external device 13a has the highest priority, external device 13b has the next highest priority, and so on.

Electronic telephone 12 therefore has the lowest priority since it can be disabled by any external device 13a, 13b, ... 13n. External devices 13b ..., 13n are connected to modules 18b ... 18n, respectively, by cables 15a ... 15n, respectively, in the same manner that external device 13a is connected to module 18a by cable 15a.

It will be appreciated that conductors 22, 31, 41 and 43 need not be brought out of the last module 18n since they are not connected to anything. Likewise, it will be appreciated that relay contacts 33m, 33n and 33o of the last module 18n may be eliminated since there is no further downstream module.

In order to provide the maximum operating voltage to electronic telephone 12 resistors 20, 21, 24 and 26 should be as low as possible. However, in order to minimize the loading of the audio signal, resistors 20 and 24 should be as high as possible. Likewise, if the port VPT output of electronic telephone 12 is not short-circuit protected, resistors 21 and 26 cannot be zero ohms. The inventor is not aware of whether or not the port VPT output of the Isoetec Keyphone II is short-circuit protected. Therefore, resistors 20, 21, 24 and 26 all have the same values, approximately 220 ohms.

If resistors 20, 21, 24 and 26 are each 220 ohms, then the effective resistance between port VPS and port VPT will be 220 ohms. If electronic telephone 12 is drawing approximately 50 milliamps, then there will be an 11 volt drop between port VPS and port VPT, If port VPS is at +30 volts (with respect to port DNS), then electronic telephone 12 will have an operating voltage of 30−11=19 volts, which is satisfactory. The inventor has found that an effective resistance, between port VPS and port VPT, of greater than approximately 500 ohms will cause the operating voltage available for electronic telephone 12 to drop below 6 volts and thereby cause electronic telephone 12 to malfunction.

If resistors 20 and 24 each are 220 ohms then the shunt resistance across conductors 11b and 11c will be 440 ohms, which produces a measurable, but generally negligible, effect on the audio signal voltage.

It will be appreciated that if the output of electronic telephone 12 is short-circuit protected, then resistors 21 and 26 may have a lower value. Of course, if resistors 21 and 26 have very low values then variable resistor 30 will have no effect and may be eliminated. Likewise, if there is no need for any audio signal to be sent by or received from electronic telephone 12 when an external device 13a, 13b, ... 13n is active, then variable resistor 30 may be eliminated. Variable resistor 30 is eliminated by connecting conductors 25 and 31 together. Also, if desired, variable resistor 30 may have a fixed value.

In order to prevent imbalance of audio signal conductors 11b and 11c, resistors 20 and 24 should have the same value, which may, as discussed above, be different from the value of resistors 21 and 26.

In some situations, the length of cable 11 and of cable 14, the voltage available between ports VPS and DNS, and/or the current draw of electronic telephone 12 may result in an insufficient voltage between ports VPT and DNT when 220 ohm resistors are used for resistors 20, 21, 24 and 26, In such situations, an alternate embodiment may be desired.

One alternative embodiment is to replace resistor 20 with a diode connected in series with a resistor, with the anode of the diode oriented toward port VPS. Resistor 24 is similarly replaced. If only diodes are used, then the audio signal voltage across conductors 11b and 11c will cause one diode to conduct more than the other diode, thereby unbalancing conductors 11b and 11c, introducing distortion, and causing data signals from ports DNS and DNT to appear on conductors 11b and 11c. The series resistor balances the currents. The inventor has found that a resistance of 47 ohms gives satisfactory results, but other values may also be used.

Similarly resistors 21 and 26 may each be replaced by a diode in series with a resistor, or just a diode.

Replacing resistors 20, 21, 24 and 26 in this manner reduces the voltage difference between the VPS and VPT terminals to a few volts.

The preferred embodiment 19 may also be used in another manner. If the position of telephone switch 10 and electronic telephone 12 are reversed, the preferred embodiment 19 will allow external devices 13a, 13b, .. . 13n to send audio signals to and/or receive audio signals from electronic telephone 12, to the partial or total exclusion of telephone switch 10. It will, of course, be appreciated that if resistors 20, 21, 24 and/or 26 have been replaced by the series diode-resistor combination discussed above then the orientation of the diodes must be reversed.

It will also be appreciated that relay 33 may be replaced by switches, transistors, etc. It will also be appreciated that if relay 33, or its equivalent, draws a sufficiently small current that the capability of telephone switch 10 is not exceeded, then power supply 37 may be eliminated and relay 33, or its equivalent, may be powered by the voltage difference between ports VPS and DNS.

It will also be appreciated that if, for example, external device 13a is active and connected to port VPS then conductors 15ab and 15ac to port V of external device 13a will be at the potential of port VPS. If there is a simultaneous connection from another conductor, for example, a ground wire, between port DNS and external device 13a, then external device 13a and/or telephone switch 10 may be damaged. This is easily prevented by inserting a 600 ohm to 600 ohm audio line transformer (not shown) between conductors 38 and 39, and conductors 15ab and 15ac. It will be appreciated by one skilled in the art that such a transformer will pass audio signals to/from external device 13a while preventing the DC potential of port VPS from reaching external device 13a.

Another alternative embodiment is to use inductors or transformers for resistors 20, 21, 24 and 26. However, as compared to resistors, or resistors and diodes, the size, weight and cost of an inductor useful at audio frequencies makes the use of inductors less desirable.

Also, resistors 20 and 21 may be a single resistor with a fixed or variable tap point corrected to conductor 22. Similarly, resistors 24 and 26 may be a single resistor with a fixed or variable tap point connected to conductor 25.

Further, resistor 30 may be replaced by an open circuit so that relay 33 does not short conductors 22 and 25. This allows a reduced audio signal to/from electronic telephone 12 when an external device 13a. 13b, . .. 13n is activated, Also, for example, conductor 39 could be directly connected to conductor 11b, instead of to contact 33c. If conductor 39 is directly connected to conductor 11b, and connector 38 is likewise directly connected to conductor 11c, then resistor 35 can be eliminated (replaced by an open circuit). In this case, external device 13a would always be connected to port VPS and activating external device 13a would merely interrupt the audio signals to electronic telephone 12.

Note that a module, for example, module 18b, can be easily configured to allow external device 13b to send-/receive audio signals to/from a downstream device 13n or electronic teleyhone 12 instead of to/from telephone switch 10. Such a module would simply have certain connections to adjacent modules received. More precisely, conductor 17 of module 18b would connect to conductor 17 of module 18a, conductor 16 of module 18b would connect to conductor 16 of downstream module 18c (not shown), conductor 34 of module 18b would connect to conductor 34 of module 18a, and conductor 32 of module 18b would connect to conductor 32 of downstream module 18c (not shown), All other connections would remain as in FIG. 2.

Since many other variations and embodiments of the present invention may suggest themselves to those skilled in the art based upon the foregoing disclosure, the present invention is to be limited only by the claims below.

I claim:

1. An interface apparatus for use in a telephone system comprising a telephone switch, an electronic telephone, and an external device; said telephone switch having at least a first conductor, a second conductor and a first data-conductor, sending and receiving audio signals by placing and being responsive to the differential voltage between said first conductor and said second conductor, and providing a first polarity of an operating voltage to said electronic telephone by placing a predetermined common voltage on said first conductor and said second conductor and a second polarity of said operating voltage to said electronic telephone via said first data conductor; said electronic telephone having at least a third conductor, a fourth conductor and a second data conductor, sending and receiving audio signals by placing and being responsive to the differential voltage between said third conductor and said fourth conductor, and receiving operating voltage from a voltage common to said third conductor and said fourth conductor with respect to said second data conductor, said first data conductor being connected to said second data conductor; said external device having at least a fifth conductor and a sixth conductor and sending and receiving audio signals by placing and being responsive to the differential voltage between said fifth conductor and said sixth conductor; wherein said first conductor is connected to said fifth conductor and said second conductor is connected to said sixth conductor; said interface apparatus selectably allowing said electronic telephone to exchange said audio signals with said telephone switch and said external device, comprising:
first network means connected between said first conductor and said third conductor;
second network means connected between said second conductor and said fourth conductor; and
switching means comprising a first part connected between said first conductor and said third conductor for selectably bypassing said first network means by shorting said first conductor to said third conductor, and a second part connected between said second conductor and said fourth conductor for selectably bypassing said second network means by shorting said second conductor to said fourth conductor.

2. The interface apparatus of claim 1 wherein said first network means comprises a first resistor.

3. The interface apparatus of claim 2 wherein said second network means comprises a second resistor.

4. The interface apparatus of claim 2 wherein said first network means further comprises a first diode in series with said first resistor.

5. The interface apparatus of claim 3 wherein said first network means further comprises a first diode in series with said first resistor.

6. The interface apparatus of claim 5 wherein said second network means further comprises a second diode in series with said second resistor.

7. The interface apparatus of claim 1 wherein said switching means further comprises a third part connected between said third conductor and said fourth conductor for selectably shorting said third conductor to said fourth conductor.

8. The interface apparatus of claim 1 wherein said switching means comprises a relay.

9. The interface apparatus of claim 1 wherein said switching means comprises a switch.

10. The interface apparatus of claim 1, said external device further having a seventh conductor and an eighth conductor and shorting said seventh conductor to said eighth conductor when said external device is in an active mode, and wherein said switching means is connected to said external device and is responsive to shorting of said seventh conductor to said eighth conductor.

11. An interface apptaratus for use in a telephone system comprising a telephone switch, an electronic telephone, and an external device; said telephone switch having at least a first conductor, a second conductor and a first data conductor, sending and receiving audio signals by placing and being responsive to the differential voltage between said first conductor and said second conductor, and providing a first polarity of an operating voltage to said electronic telephone by placing a predetermined common voltage on said first conductor and said second conductor; and a second polarity of said operating voltage to said electronic telephone via said first data conductor; said electronic telephone having at least a third conductor, a fourth conductor, and a second data conductor, sending and receiving audio signals by placing and being responsive to the differential voltage between said third conductor and said fourth conductor, and receiving operating voltage from a voltage common to said third conductor and said fourth conductor with respect to said second data conductor, said first data conductor being connected to said second data conductor; said external device having at least a fifth conductor and a sixth conductor and sending and receiving audio signals by placing and being responsive to the differential voltage between said fifth conductor and said sixth conductor; said interface apparatus selectably connecting said telephone switch to either said electronic telephone or said external device, comprising:
first network means connected between said first conductor and said third conductor and having a first tap point;
second network means connected between said second conductor and said fourth conductor; and having a second tap point; and
switching means comprising a first part connected to said first conductor for selectably byptassing said first network means by shorting said first conductor to said third conductor or, alternately, connecting said first conductor to said fifth conductor, a second part connected to said third conductor for selectably bypassing said second network means by shorting said second conductor to said fourth conductor or, alternately, connecting said second conductor to said sixth conductor, and a third part for selectably disconnecting said first tap point from said second tap point or, alternately, shorting said first tap point to said second tap point.

12. The interface apparatus of claim 11 and further comprising:
third network means connected between said first tap point and said third part of said switching means.

13. The interface apparatus of claim 12 wherein said third network means comprises a first resistor.

14. The interface apparatus of claim 13 wherein said first resistor is a variable resistor.

15. The interface apparatus of claim 11 wherein said first network means comprises the series combination of a second resistor, said first tap point, and a third resistor.

16. The interface apparatus of claim 15 wherein said second network means comprises the series combination of a fourth resistor, said second tap point, and a fifth resistor.

17. The interface apparatus of claim 16 and further comprising:
third network means connected between said first tap point and said third part of said switching means.

18. The interface apparatus of claim 17 wherein said third network means comprises a first resistor.

19. The interface apparatus of claim 18 wherein said first resistor is a variable resistor.

20. The interface apparatus of claim 11 wherein said first network means comprises a first series combination of a first diode, a second resistor, and a third resistor, said first tap point being a first point in said first series combination between said second resistor and said third resistor.

21. The interface apparatus of claim 20 wherein said second network means comprises a second series combination of a second diode, a fourth resistor, and a fifth resistor, said second tap point being a second point in said second series combination between said fourth resistor and said fifth resistor.

22. The interface apparatus of claim 20 wherein said first series combination further comprises a third diode.

23. The interface apparatus of claim 21 wherein said first series combination further comprises a third diode.

24. The interface apparatus of claim 23 wherein said second series combination further comprises a fourth diode.

25. The interface apparatus of claim 21 and further comprising:
third network means connected between said first tap point and said third port of said switching means.

26. The interface apparatus of claim 25 wherein said third network means comprises a first resistor.

27. The interface apparatus of claim 26 wherein said first resistor is a variable resistor.

* * * * *